(12) United States Patent
Gaikwad

(10) Patent No.: US 7,646,823 B2
(45) Date of Patent: *Jan. 12, 2010

(54) MIMO CHANNEL ESTIMATION IN PRESENCE OF SAMPLING FREQUENCY OFFSET

(75) Inventor: Rohit V. Gaikwad, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 550 days.

This patent is subject to a terminal disclaimer.

(21) Appl. No.: 11/590,062

(22) Filed: Oct. 30, 2006

(65) Prior Publication Data
US 2008/0101495 A1    May 1, 2008

(51) Int. Cl.
H04B 7/02 (2006.01)
(52) U.S. Cl. .................. 375/267; 375/299; 375/347
(58) Field of Classification Search .................. 375/267, 375/347, 349, 260
See application file for complete search history.

(56) References Cited

U.S. PATENT DOCUMENTS

2004/0131012 A1*  7/2004  Mody et al. .................. 370/210
2008/0101496 A1*  5/2008  Gaikwad ..................... 375/267
2008/0159424 A1*  7/2008  Hoo et al. .................... 375/260
2009/0041144 A1*  2/2009  Biswas et al. ............... 375/260

OTHER PUBLICATIONS

"A Technique for Orthogonal Frequency Division Multiplexing Frequency Offset Correction"; Paul H. Moose; IEEE Transactions on Communication, vol. 42, No. 10, Oct. 1994; pp. 2908-2914.

* cited by examiner

Primary Examiner—Emmanuel Bayard
(74) Attorney, Agent, or Firm—Garlick Harrison & Markison

(57) ABSTRACT

A technique to determine sampling frequency offset (SFO) phase shift and perform channel estimation for symbols of a signal communicated across a multiple-input-multiple-output (MIMO) communication channel, in which preambles utilized for channel estimation are sent over more than one time block. Because the transmission of preambles used for channel estimation are sent over multiple time blocks, a SFO phase shift that is linear across tones of an OFDM signal is experienced between preambles of the two time blocks. Upon detection of the SFO phase shift, a weighting matrix used for channel estimation is modified to account for the SFO phase shift, in order to perform the channel estimation with correction for the SFO phase shift.

20 Claims, 10 Drawing Sheets

MIMO CHANNEL ESTIMATION IN PRESENCE OF SAMPLING FREQUENCY OFFSET

BACKGROUND OF THE INVENTION

1. Technical Field of the Invention

The embodiments of the invention relate to wireless communications and more particularly to sampling frequency offset estimation and adjustment in a receiver of a multiple-input and multiple-output system.

2. Description of Related Art

Communication systems are known to support wireless and wire lined communications between wireless and/or wire lined communication devices. Such communication systems range from national and/or international cellular telephone systems, the Internet and to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera, communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switch telephone network, via the Internet, and/or via some other wide area network.

For each wireless communication device to participate in wireless communications, it typically includes a built-in radio transceiver (i.e., receiver and transmitter) or is coupled to an associated radio transceiver (e.g., a station for in-home and/or in-building wireless communication networks, RF modem, etc.). The receiver may be coupled to an antenna and the receiver may include a low noise amplifier, one or more intermediate frequency stages, a filtering stage, and a data recovery stage. The low noise amplifier receives inbound RF signals via the antenna and amplifies them. The one or more intermediate frequency stages mix the amplified RF signals with one or more local oscillators to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

The transmitter typically includes a data modulation stage, one or more intermediate frequency stages, and a power amplifier stage. The data modulation stage converts raw data into baseband signals in accordance with a particular wireless communication standard. The one or more intermediate frequency stages mix the baseband signals with one or more local oscillators to produce RF signals. The power amplifier amplifies the RF signals prior to transmission via an antenna.

In traditional wireless systems, the transmitter may include one antenna for transmitting the RF signals, which are received by a single antenna, or multiple antennas, of a receiver. When the receiver includes two or more antennas, the receiver generally selects one of them to receive the incoming RF signals. In this instance, the wireless communication between the transmitter and receiver is a single-output-single-input (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802,11b, or 802.11g employ SISO wireless communications.

Other types of wireless communications include single-input-multiple-output (SIMO), multiple-input-single-output (MISO), and more recently, multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The captured receive signals are jointly processed to recover the original data.

With the various types of wireless communications (e.g., SISO, MISO, SIMO, and MIMO) and standards (e.g., IEEE 802.11, IEEE 802.11a, IEEE 802.11b, IEEE 802.11g, IEEE 802.11n, extensions and modifications thereof), a large number of combination of types and standards is possible. However, when a wireless communication utilizes MIMO format for communicating between a receiver and a transmitter, complexities result due to the multiple transmission and receive paths for a given signal. Estimating channels at the receiver for a received signal generally requires taking into account the multiple signal paths from the transmitter.

A number of factors are known to impair or degrade the received signal when the receiver is performing channel estimation. One of these impairments is carrier frequency offset (CFO). Another is sampling frequency offset (SFO). Carrier frequency offset occurs when the carrier frequency ($f_c$) in the receiver is not at the exact frequency of the transmitted carrier. Similarly, sampling frequency offset occurs when the actual sampling frequency ($f_s$) of the received signal is not at the exact desired sampling frequency expected at the receiver to sample the incoming signal.

In a typical SISO system, CFO and SFO estimation and adjustment are fairly simple to implement. However, in MIMO systems, CFO and SFO estimation and adjustment are more complicated to implement due to the use of multiple antennas for transmission and reception. Furthermore, when MIMO systems utilize a technique that transmits a particular data stream during different time blocks, the complexities of estimating and adjusting for CFO and SFO are compounded by additional offsets that result from timing separation of the transmitted data.

Channel estimation is a technique employed in the receiver to obtain an estimation of the transmission path of the transmitted signal, in which the estimation is used to recover the signal. With the use of multiple antennas in a MIMO system, channel estimation generally involves matrix operations, instead of a simple vector for SISO system. The CFO and/or SFO experienced in the receiver may introduce phase errors, resulting in undesirable placement of signal points in a signal constellation. Generally, the phase error causes the received signal points to rotate within the constellation, so that signal points are not disposed at corrects locations within the constellation. Since channel estimation involves interpreting the received signals for correct transformation to process the received signal, CFO and SFO induced phase errors may make channel estimation difficult or not possible to achieve.

Accordingly, there is a need to provide a channel estimation technique that considers presence of CFO and/or SFO in a MIMO receiver.

SUMMARY OF THE INVENTION

The present invention is directed to apparatus and methods of operation that are further described in the following Brief Description of the Drawings, the Detailed Description of the Embodiments of the Invention, and the Claims. Other features and advantages of the present invention will become apparent from the following detailed description of the embodiments of the invention made with reference to the accompanying drawings.

DETAILED DESCRIPTION OF THE EMBODIMENTS OF THE INVENTION

The embodiments of the present invention may be practiced in a variety of settings that implement channel estimation and, particularly, adjusting for carrier frequency offset and/or sampling frequency offset, when performing channel estimation in a MIMO receiver of a wireless communication device.

Figure 1:
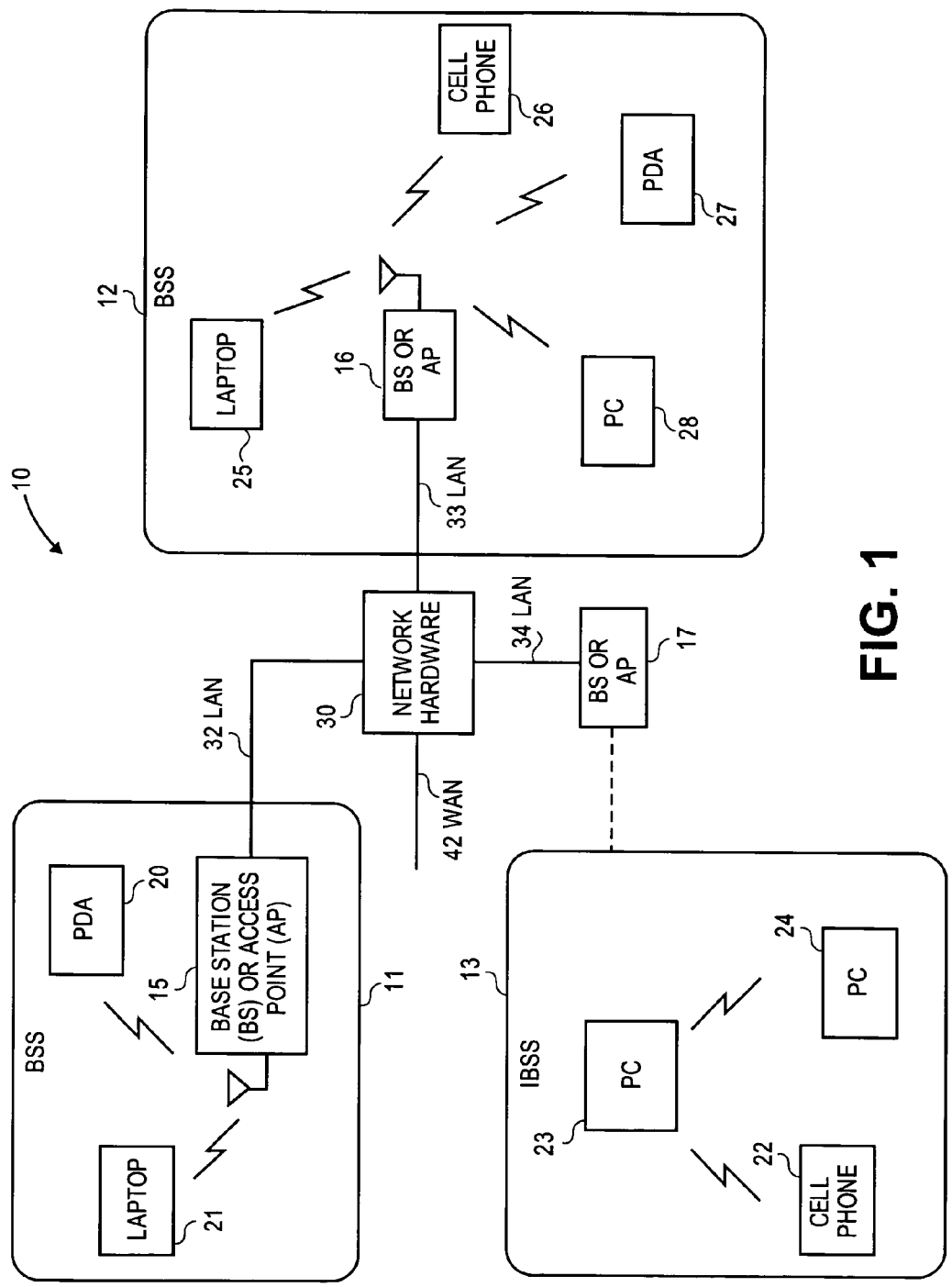
FIG. 1 is a block schematic diagram illustrating a wireless communication system in accordance with one embodiment of the present invention.

FIG. 1 is a schematic block diagram illustrating a communication system 10 that includes a plurality of base stations and/or access points (BS/AP) 15, 16, 17, a plurality of wireless communication devices 20-28 and a network hardware component 30. Network hardware component 30, which may be a router, switch, bridge, modem, system controller, et cetera, may provide a wide area network (WAN) coupling 31 for communication system 10. Furthermore, wireless communication devices 20-28 may be of a variety of devices, including laptop computers 21, 25; personal digital assistants (PDA) 20, 27; personal computers (PC) 23, 24, 28; and/or cellular telephones (cell phone) 22, 26. The details of the wireless communication devices shown is described in greater detail with reference to FIG. 2.

Wireless communication devices 22, 23, and 24 are shown located within an independent basic service set (IBSS) area 13 and these devices communicate directly (i.e., point to point). In this example configuration, these devices 22, 23, and 24 typically communicate only with each other. To communicate with other wireless communication devices within system 10 or to communicate outside of system 10, devices 22-24 may affiliate with a base station or access point, such as BS/AP 17, or one of the other BS/AP units 15, 16.

BS/AP 15, 16 are typically located within respective basic service set (BSS) areas 11, 12 and are directly or indirectly coupled to network hardware component 30 via local area network (LAN) couplings 32, 33. Such couplings provide BS/AP 15, 16 with connectivity to other devices within system 10 and provide connectivity to other networks via WAN connection 31. To communicate with the wireless communication devices within its respective BSS 11, 12, each of the BS/AP 15, 16 has an associated antenna or antenna array. For instance, BS/AP 15 wirelessly communicates with wireless communication devices 20, 21, while BS/AP 16 wirelessly communicates with wireless communication devices 25-28. Typically, the wireless communication devices register with a particular BS/AP 15, 16 to receive services within communication system 10. As illustrated, when BS/AP 17 is utilized with IBSS area 13, LAN coupling 17 may couple BS/AP 17 to network hardware component 30.

Typically, base stations are used for cellular telephone systems and like-type systems, while access points are used for in-home or in-building wireless networks (e.g., IEEE 802.11 and versions thereof, Bluetooth, and/or any other type of radio frequency based network protocol). Regardless of the particular type of communication system, each wireless communication device includes a built-in radio and/or is coupled to a radio.

Figure 2:
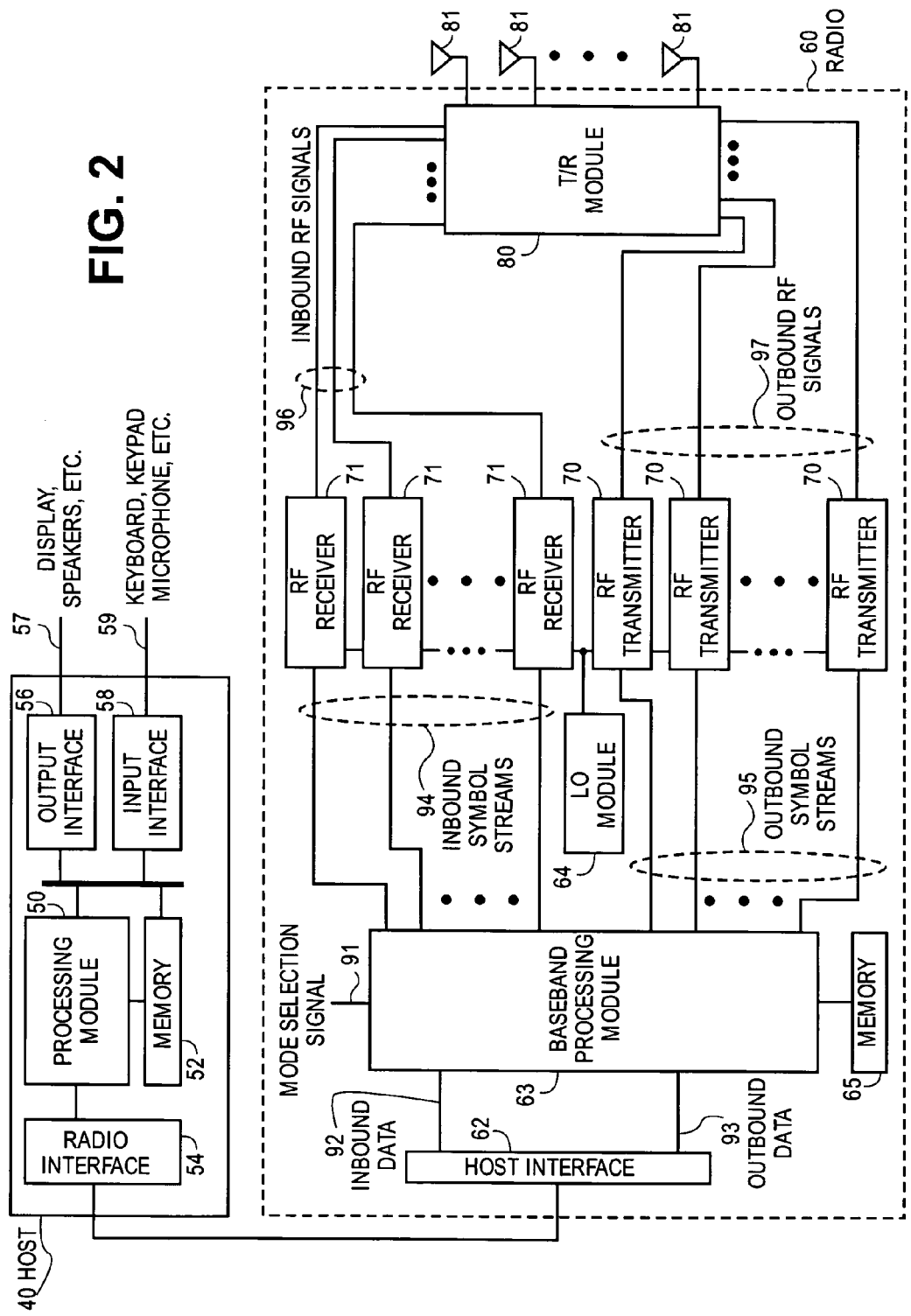
FIG. 2 is a block schematic block diagram illustrating a wireless communication apparatus in accordance with one embodiment of the present invention.

FIG. 2 is a schematic block diagram illustrating a wireless communication device that includes a host 40 and an associated radio 60. Host 40 may be one of the devices 20-28 shown in FIG. 1. For cellular telephone hosts, radio 60 is typically a built-in component. For personal digital assistant hosts, laptop hosts, and/or personal computer hosts, radio 60 may be built-in or an externally coupled component.

As illustrated, host 40 includes a processing module 50, memory 52, radio interface 54, input interface 58 and output interface 56. Processing module 50 and memory 52 execute corresponding instructions that are typically done by the host device. For example, for a cellular telephone host device, processing module 50 may perform the corresponding communication functions in accordance with a particular cellular telephone standard.

Generally, radio interface 54 allows data to be received from and sent to radio 60. For data received from radio 60 (such as inbound data 92), radio interface 54 provides the data to processing module 50 for further processing and/or routing to output interface 56. Output interface 56 provides connectivity on line 57 to an output device, such as a display, monitor, speakers, et cetera, in order to output the received data. Radio interface 54 also provides data from processing module 50 to radio 60. Processing module 50 may receive outbound data on line 59 from an input device, such as a keyboard, keypad, microphone, et cetera, via input interface 58 or generate the data itself. For data received via input interface 58, processing module 50 may perform a corresponding host function on the data and/or route it to radio 60 via radio interface 54.

Radio 60 includes a host interface 62, a baseband processing module 63, memory 65, one or more radio frequency (RF) transmitter units 70, a transmit/receive (T/R) module 80, one or more antennas 81, one or more RF receivers 71 and a local oscillation (LO) module 64. Baseband processing module 63, in combination with operational instructions stored in memory 65, executes digital receiver functions and digital transmitter functions. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion.

Baseband processing module 63 may be implemented using one or more processing devices. Such processing device(s) may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Memory 65 may be a single memory device or a plurality of memory devices. Such a memory device may be a read-only memory, random access memory, volatile memory, non-volatile memory, static memory, dynamic memory, flash memory, and/or any device that stores digital information. Note that when processing module 63 implements one or more of its functions via a state machine, analog circuitry, digital circuitry, and/or logic circuitry, the memory storing the corresponding operational instructions may be embedded with the circuitry comprising the state machine, analog circuitry, digital circuitry, and/or logic circuitry.

In operation, radio 60 receives outbound data 93 from host 40 via host interface 62. Baseband processing module 63 receives outbound data 93 and based on a mode selection signal 91, produces one or more outbound symbol streams 95. Mode selection signal 91 typically indicates a particular mode of operation that is compliant with one or more specific modes of the various IEEE 802.11 standards. For example, in one embodiment mode selection signal 91 may indicate a frequency band of 2.4 GHz, a channel bandwidth of 20 or 22 MHz and a maximum bit rate of 54 megabits-per-second. In this general category, mode selection signal 91 may further indicate a particular rate ranging from 1 megabit-per-second to 54 megabits-per-second, or higher.

In addition, mode selection signal 91 may indicate a particular type of modulation, which includes, but is not limited to, Barker Code Modulation, BPSK, QPSK, CCK, 16 QAM and/or 64 QAM, as well as others. Mode selection signal 91 may also include a code rate, a number of coded bits per subcarrier (NBPSC), coded bits per OFDM symbol (NCBPS), and/or data bits per OFDM symbol (NDBPS). Mode selection signal 91 may also indicate a particular channelization for the corresponding mode that provides a channel number and corresponding center frequency. Mode select signal 91 may further indicate a power spectral density mask value and a number of antennas to be initially used for a MIMO communication.

Baseband processing module 63, based on mode selection signal 91, produces one or more outbound symbol streams 95 from outbound data 93. For example, if mode selection signal 91 indicates that a single transmit antenna is being utilized for the particular mode that has been selected, baseband processing module 63 produces a single outbound symbol stream 95. Alternatively, if mode selection signal 91 indicates 2, 3 or 4 antennas, baseband processing module 63 produces respective 2, 3 or 4 outbound symbol streams 95 from outbound data 93.

Depending on the number of outbound symbol streams 95 (e.g. 1 to n) produced by baseband processing module 63, a corresponding number of RF transmitters 70 are enabled to convert outbound symbol stream(s) 95 into outbound RF signals 97. Generally, each RF transmitter 70 includes a digital filter and up sampling module, a digital to analog conversion module, an analog filter module, a frequency up conversion module, a power amplifier, and a radio frequency bandpass filter. RF transmitters 70 provide outbound RF signals 97 to T/R module 80, which provides each outbound RF signal 97 to a corresponding antenna 81.

When radio 60 is in the receive mode, T/R module 80 receives one or more inbound RF signals 96 via antenna(s) 81 and provides signal(s) 96 to respective one or more RF receivers 71. RF receiver(s) 71 converts inbound RF signals 96 into a corresponding number of inbound symbol streams 94. The number of inbound symbol streams 94 corresponds to the particular mode in which the data was received. Baseband processing module 63 converts inbound symbol streams 94 into inbound data 92, which is provided to host 40 via host interface 62.

The wireless communication device of FIG. 2 may be implemented using one or more integrated circuits. For example, host 40 may be implemented on one integrated circuit, baseband processing module 63 and memory 65 may be implemented on a second integrated circuit, and the remaining components of radio 60 (less the antennas 81) may be implemented on a third integrated circuit. As an alternative embodiment, baseband processing module 63 and radio 60 may be implemented on a single integrated circuit. In another embodiment, processing module 50 of host 40 and baseband processing module 63 may be a common processing device implemented on a single integrated circuit. Furthermore, memory 52 and memory 65 may be implemented on the same memory device and/or on the same integrated circuit as the common processing modules of processing module 50 and baseband processing module 63. It is be noted that other embodiments may be implemented with the various units of FIG. 2.

Figure 3:
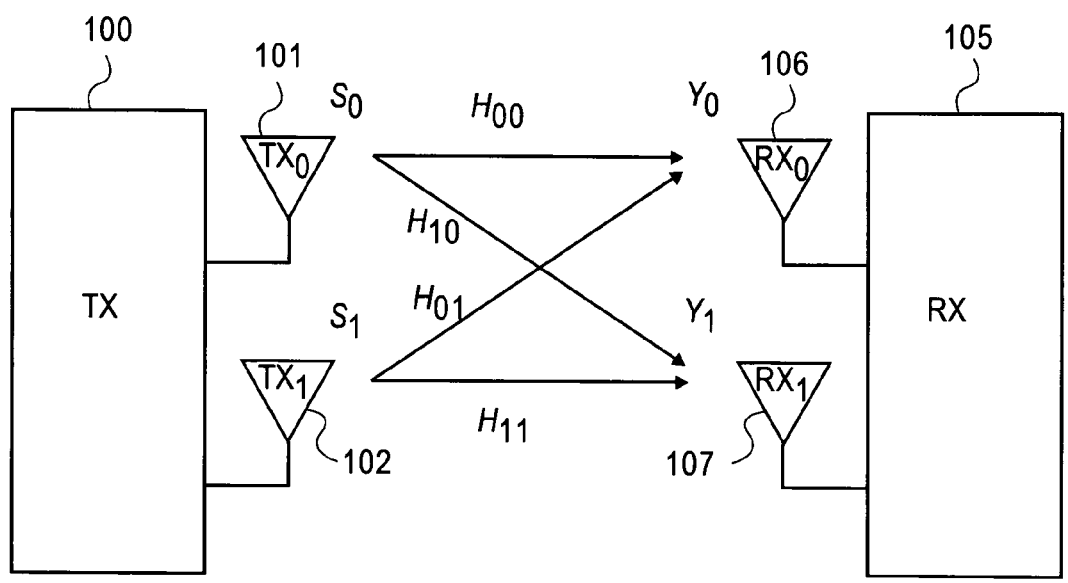
FIG. 3 is a diagram of a MIMO communication system having two antennas at a transmitter and two antennas at a receiver.

The various embodiments of the wireless communication device of FIG. 2 may be implemented in a transmitter and/or a receiver utilized for wireless communications. Typically, the communication is both ways so that the two units communicating typically will employ a transceiver in order to send and receive data. The multiple RF transmitters 70 and RF receivers 71 allow the device of FIG. 2 to be utilized in a multiple antenna transceiver system. FIG. 3 shows one particular example when communication is achieved using two antennas at the transmitter and two antennas at the receiver.

In FIG. 3 a transmitting (TX) unit 100 is shown having two antennas 101, 102, while a receiving (RX) unit 105 is shown having two antennas 106, 107. It is to be noted that both transmitting unit 100 and receiving unit 105 are generally both transceivers, but are shown as separate TX and RX units for exemplary purpose in FIG. 3. That is, TX unit 100 is transmitting data and RX unit 105 is receiving the transmitted data. The transmitted data symbols at antennas 101 ($TX_0$), 102 ($TX_1$) are noted as $S_0$ and $S_1$, respectively. The received data symbols at antennas 106 ($RX_0$), 107 ($RX_1$) are noted as $Y_0$ and $Y_1$, respectively. Since the example illustrates a two-transmit-antenna/two-receive-antenna MIMO system, the four resulting RF signal paths are noted as $H_{00}$, $H_{01}$, $H_{10}$ and $H_{11}$ (using the $H_{RX\_TX}$ notation) and the data path is referred to as channel H.

It is appreciated that the more advanced communication protocols may utilize multiplexed signals when transmitting data in order to increase the transmitted bandwidth. For example, orthogonal frequency division multiplexing (OFDM) utilize multiple tones in which each of the tones correspond to a data sub-carrier (or sub-channel). The multiple signals are of equal energy and duration and the signal frequencies are equally separated, so that the signals are orthogonal to one another. In SISO systems, it is readily simple for the receiver to estimate the transmitted channel since there is only one transmit antenna and one receive antenna. Generally, the practice is to use a Fast Fourier Transform (FFT) so that each tone k is represented as:

$$Y(k)=H(k)S(k)+Z(k)$$

where S(k) denotes the known transmitted signal on subcarrier (or tone) k, H(k) denotes the frequency domain complex value of the impulse response of channel H on tone k, Y(k) denotes the signal at the receiver for each tone k and Z(k) denotes additive interference on each tone k. Neglecting for noise, a channel at the receiver may be identified by employing a one tap filter to equalize the received signal. A channel may be identified at the receiver by employing a channel estimation technique of estimating H from the received signal Y. For example, an estimation of H may be obtained from the above Y=HS equation (neglecting for noise) by employing a conjugate of S, in which H is defined as:

$$H = Y \text{conjugate}(S) = YS^*$$

where * denotes a conjugate.

For example, in a typical communication scheme where receivers perform channel estimation to estimate the channel for a received signal, a training sequence(s) may be sent by the transmitter to train the receiver to estimate the channel. The training sequence is included in the preamble portion of a packet to educate the receiver as to the form of the transmitted signal. The data portion, referred to as a payload, follows the preamble portion. By utilizing one of a variety of techniques, such as an adaptive algorithm for maximum likelihood estimation, a receiver may converge toward an estimate of a given channel. For example, coefficients of a receiver equalizer may converge to a best estimate value for a channel during receiver training and then use the estimated values obtained from the training sequence to recover the transmitted data payload.

Thus, by utilizing a training signal in a preamble portion of a transmitted data stream from the transmitter, the receiver is able to configure itself to an estimated value of the channel for recovering the data. Applying the above equation, a known value may be transmitted with the training sequence of a preamble so that estimation of H may be determined. Once H estimation is calculated, H estimation is then utilized to operate on the payload to recover the data.

When multiple signals are transmitted from TX unit 100, H estimation is more complex, since there are now four potential H values ($H_{00}$–$H_{11}$) to decipher due to the multiple antenna paths. That is, in reference to FIG. 2, outbound data 93 may be split into one or more outbound symbol streams 95, which is then sent out as one or more outbound RF signals 97. In a two transmit antenna system, such as TX unit 100 of FIG. 3, outbound data 93 is split into two paths by baseband processing module 63 and transmitted from respective two antennas 81.

Figure 4:
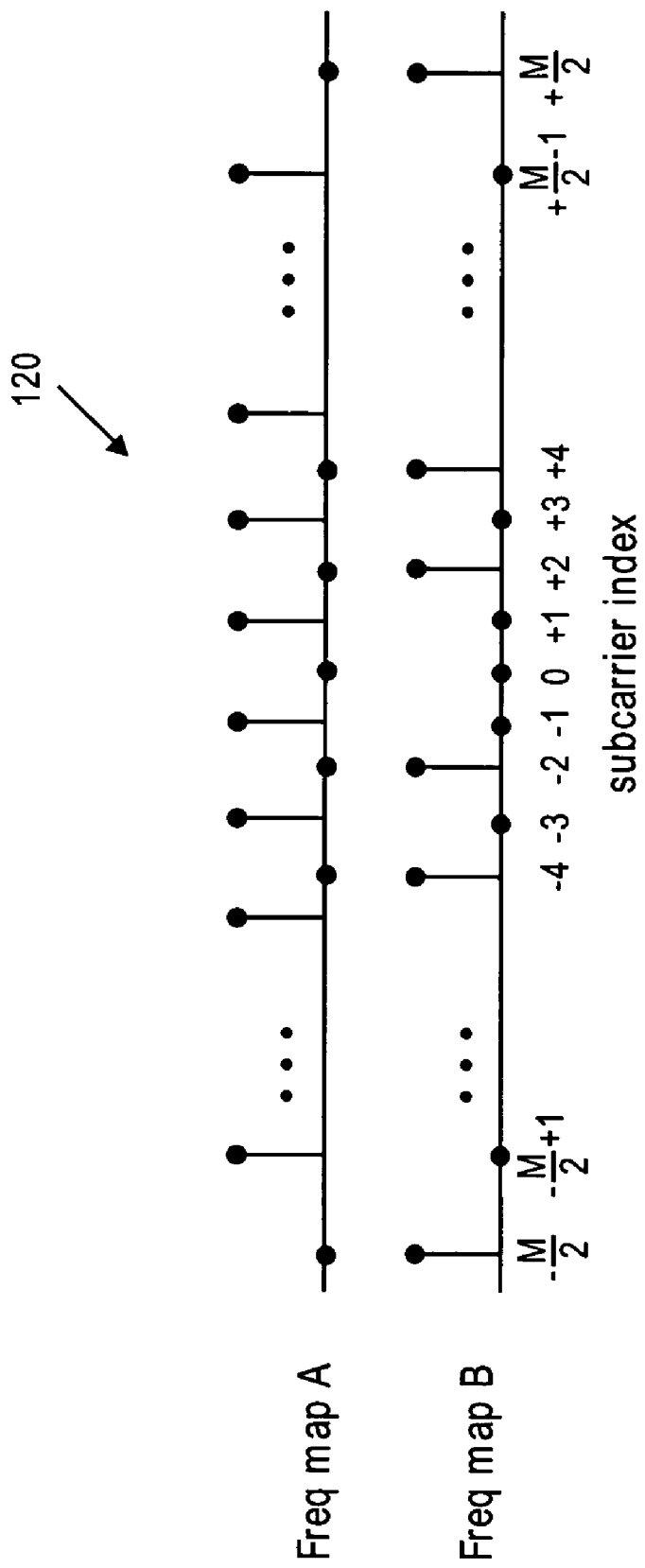
FIG. 4 is a diagram showing odd and even mapping of a subcarrier index for transmitting from the two transmitter antennas for the system of FIG. 3.
Figure 5:
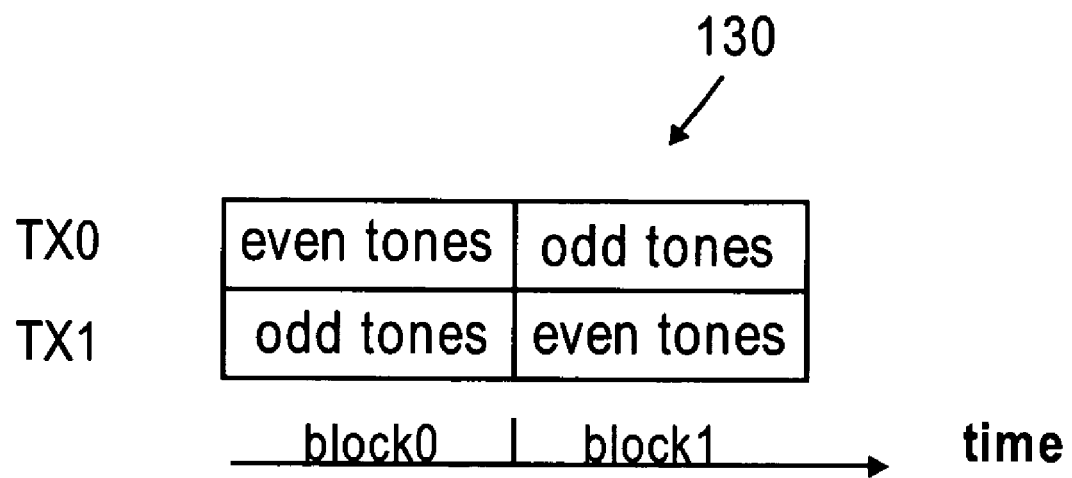
FIG. 5 is a table illustrating a transmission of a preamble from the two antennas of the transmitter of FIG. 3 over two time blocks for the subcarrier mapping of FIG. 4.

One technique of separating the outbound data into more than one transmitted data stream to train the receiver is illustrated in the example embodiment of FIGS. 4 and 5. FIG. 4 shows multiple tones transmitted by subcarriers of the transmitted signal. In the particular example, the shown multiple channel transmission is OFDM, but other multiplexed communication protocols may be used. The subcarrier index in FIG. 4 uses "M" to indicate a number of active subcarriers about a center carrier frequency $f_c$ (at index 0). The "+" numbers (+1,+2,+3 . . . ) indicate the upper band and the "-" numbers (-1,-2,-3 . . . ) indicate the lower band. In the particular embodiment shown, each subcarrier represents a tone for orthogonal signal transmission.

In FIG. 4, an orthogonal tone mapping diagram 120 is shown, in which the subcarriers are separated into two frequency maps, shown as frequency map A and frequency map B. As shown, frequency map A has the energy content in the odd tones and frequency map B has the energy content in the even tones. That is, when an outbound packet is processed into one or more sub-carriers for transmission (such as by baseband processing module 63 of FIG. 2) based on a communication protocol selected, specific tones are zeroed out so that the energy content is separated out into even and odd tones. The transmission of the separately-mapped tones is shown in the mapping diagram of FIG. 5.

It is to be noted that all tones are present in each map A, B, but corresponding even or odd tones are zeroed (or at least suppressed). For the description below, the non-suppressed tones are simply referred to as even (or odd) tones in a transmission.

In FIG. 5, table 130 illustrates how two transmitter antennas $TX_0$ and $TX_1$ transmit the even and odd tones. For the example diagram of FIG. 3, antenna 101 ($TX_0$) transmits signal $S_0$ and antenna 102 ($TX_1$) transmits signal $S_1$. Instead of transmitting all of the tones in one time block, during a first transmission block (block 0) $TX_0$ transmits the even tones. During a subsequent time block (block 1), $TX_0$ transmits the odd tones. In a similar scheme, $TX_1$ transmits its odd tones at time block 0 and, subsequently, during time block 1 $TX_1$ transmits the even tones. Thus, for a two antenna transmitter, antenna $TX_0$ alternate energy between its even and odd tones for the two time blocks. Similarly, antenna $TX_1$ alternate between its odd and even tones for the two time blocks.

It is to be noted that $TX_0$ sends both even and odd indices of the subcarriers shown in FIG. 4, but at different times. Likewise, $TX_1$ sends both even and odd indices of the subcarriers at different times. $TX_0$ and $TX_1$ alternate the even and odd transmissions, however, at any given time block that the symbols are sent, both even and odd tones are sent, although from different antennas. Thus, for a transmitter having two transmitting antennas, a 2×2 matrix of tones are transmitted in two time blocks. It is to be noted that the even/odd separation in two time blocks is but one example of how channel orthogonality is achieved. Other techniques to obtain orthogonality of symbols sent over multiple time blocks may be implemented in other embodiments.

Each even or odd block from a transmitting antenna is referred to as a symbol. Generally, for each symbol from each transmitting antenna, at least one training sequence is sent. It is to be noted that in other embodiments, the actual mapping may be reversed from that shown in table 130, in that $TX_0$ may send the odd tones during time block 0 and even tones during time block 1, while $TX_1$ may send even tones during time block 0 and odd tones during time block 1.

The odd and even tone mapping includes a training sequence for each symbol. The training sequences are typically sent as a portion of a preamble of a packet, so that the training sequences are used to train the receiver to configure the receiver in performing channel estimation, in order to recover the sent data. Thus, in order to perform channel estimation, one embodiment for the even/odd tone transmission $S_0$ and $S_1$ from the 2×2 MIMO system of FIG. 3 may be represented as $TX_0 = W_{0k}{}^0 L_k$ for time block 0, and $W_{0k}{}^1 L_k$ for time block 1

$TX_1 = W_{1k}{}^0 L_k$ for time block 0, and $W_{1k}{}^1 L_k$ for time block 1 where, W is a weighting matrix applied to channel H, in which the subscript and superscript of W denote transmit antenna # (subscript), tone # (k), time block # (superscript); and $L_k$ represents a training sequence on tone k.

The receiver equations utilizing a weighting matrix for received signal $Y_0$ may take the following forms to describe the reception at receiver antenna $RX_0$:

$R_{0k}{}^0 = W_{0k}{}^0 L_k H_{0k} + W_{1k}{}^0 L_k H_{1k}$ $R_{0k}{}^1 = W_{0k}{}^1 L_k H_{0k} + W_{1k}{}^1 L_k H_{1k}$ and in matrix form as:

$$\begin{bmatrix} R_{0k}^0 \\ R_{0k}^1 \end{bmatrix} L_k^* = \begin{bmatrix} W_{0k}^0 & W_{1k}^0 \\ W_{0k}^1 & W_{1k}^1 \end{bmatrix} \begin{bmatrix} H_{0k} \\ H_{1k} \end{bmatrix}$$

in which the subscript and superscript of R denote receiver antenna #, tone #, time block # for received signal R; the same transmitter number designations noted above apply to weighting matrix W and channel H; and where * denotes the conjugate of $L_k$. It is to be noted that a similar set of equations is established for signal $Y_1$ at the second receiver antenna $RX_1$, using H parameters corresponding to communication path for $RX_1$.

It is to be noted that one of a variety of weighting matrices may be used for W depending on the type of training sequence utilized. For example, in one embodiment, W is set as:

$$W_{even} = \begin{bmatrix} 1 & 1 \\ 1 & -1 \end{bmatrix} \text{ for even tones and}$$

$$W_{odd} = \begin{bmatrix} 1 & -1 \\ 1 & 1 \end{bmatrix} \text{ for odd tones.}$$

In another embodiment, W is set as:

$$W_{even} = \begin{bmatrix} 1 & 0 \\ 0 & 1 \end{bmatrix} \text{ for even tones and}$$

$$W_{odd} = \begin{bmatrix} 0 & 1 \\ 1 & 0 \end{bmatrix} \text{ for odd tones.}$$

It is to be noted that a variety of techniques may be employed to perform channel estimation on a MIMO system, in which OFDM tones are sent at different time periods (noted as time blocks). In particular, one example technique is described in a co-pending patent application entitled "Channel estimation for orthogonal preambles in a MIMO system;" application Ser. No. 11/298,157; filed Ser. No. 12/09/2005; and which application is incorporated herein by reference. However, the invention need not be limited to this or any particular technique and embodiments of the invention may be readily made operable with variety of transmission schemes or protocols that utilize multiple transmitting and/or multiple receiving antennas.

Channel Estimation with CFO

Carrier frequency offset (CFO) is well known in transmission systems and variety of techniques address the estimation and correction of CFO in a receiver for recovery of data. Many of these techniques obtain a CFO estimate by repeated correlation of the received data. For example, correlation of successive repeated portion of data in a packet may yield a phase value based on the equation $e^{-j2\pi(\Delta fc)N(Ts)}$ where $\Delta f_c$ is the offset, N is the time evolution number of the sample and Ts is the sampling instant (time of the sample). The phase value may then be used to determine the amount of the CFO and appropriate corrective action taken. One technique for estimating and correcting CFO is described in a co-pending patent application entitled "Apparatus and method for carrier frequency offset estimation and correction in a wireless communication system;" application Ser. No. 11/312,512; filed Ser. No. 12/21/2005; and which application is incorporated herein by reference.

Although various techniques address CFO estimation and offset, these techniques may take considerable amount of time to obtain the number of samples to correlate the CFO determining information. Furthermore, complications are introduced when a MIMO system operates by separating sub-carrier transmission into multiple time blocks of information, in which the information conveyed in the multiple time blocks are utilized to perform channel estimation. For example, with the earlier described scheme of using even/odd OFDM tone transmissions over two separate time blocks, additional errors may be introduced because of the two separate time blocks are used to transmit the preambles used for channel estimation. If the channel (H) did not change between time block 0 and time block 1, CFO would not change between the time blocks and CFO errors may be calculated based on known CFO techniques. However, typically CFO does not stay the same between subsequent time blocks. An example of a phase shift that changes the characteristic of H between time block 0 and time block 1 is illustrated below.

Figure 6:
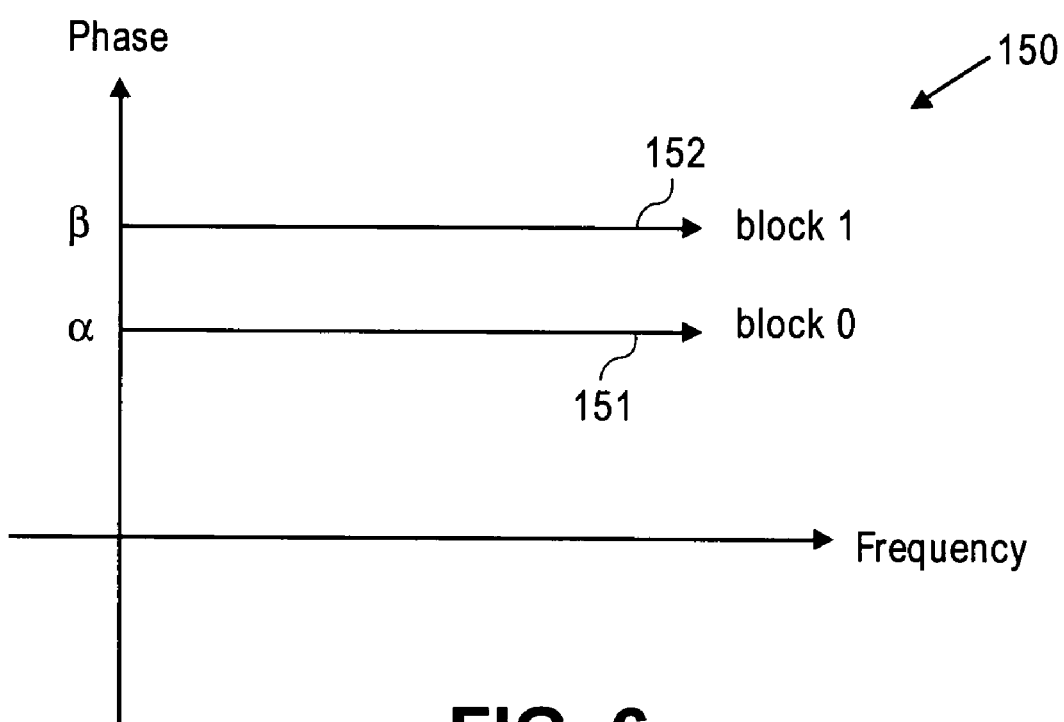
FIG. 6 is a diagram illustrating a CFO that has a flat phase shift across tones of an OFDM signal transmitted in two time blocks, in which the OFDM signal has energy content in the even tones during one time block and in the odd tones during another time block.

In FIG. 6, a phase-frequency diagram 150 illustrates a phase shift that occurs to the incoming signal between time block 0 and time block 1. At time block 0, the phase of the channel may be represented as $H_{0k} e^{j\alpha}$ and at time block 1, the phase of the channel may be represented as $H_{1k} e^{j\beta}$. If symbols sent through channel H did not experience a phase difference between time block 0 and time block 1, phase $\alpha$ would equal phase $\beta$. However, due to the time difference between block 0 and block 1, an additional phase shift is introduced on top of $\alpha$, so that $\alpha$ does not equal $\beta$. The additive influence on the phase of the incoming signal as time lapses is generally referred to as a "phase roll," since the phase shift is typically some consistent value that progresses onto the previous phase value.

FIG. 6 illustrates an effect of this phase roll on CFO after a Fast-Fourier-Transform (FFT) operation. The carrier frequency phase offset value noted by $\alpha$ occurs at time block 0 and carrier frequency phase offset value noted by $\beta$ occurs at time block 1. The phase offset, as applied to CFO, has a flat phase response across all tones (frequency), as exemplified by the horizontal (flat) lines representing $\alpha$ and $\beta$. It has been determined that there is a specific phase difference between subsequent time blocks if the time blocks are consistent. The phase roll from transmitting the tones at different time blocks typically introduces additional component of CFO (sometimes referred to residual CFO) on top of any other CFO errors that may be present.

Since channel estimation in a receiver is performed by using information in symbols transmitted during time block 0 and time block 1, it is advantageous to adjust for this CFO error quickly, so that faster and/or more accurate channel estimation may be performed that accounts for the CFO in preamble information used to estimate the channel. The following equations illustrate one embodiment of the invention for performing channel estimation in presence of the phase shift (phase roll), which is caused by transmitting the tones of an OFDM carrier over multiple time blocks. Based on the phase shift that is introduced by having the multiple time blocks, the receive signal equations for receiver antenna $RX_0$ may be represented as:

$$R_{0k}^0 = W_{0k}^0 L_k H_{0k} e^{j\alpha} + W_{1k}^0 L_k H_{1k} e^{j\alpha}$$

$$R_{0k}^1 = W_{0k}^1 L_k H_{0k} e^{j\beta} + W_{1k}^1 L_k H_{1k} e^{j\beta}$$

and $$\begin{bmatrix} R_{0k}^0 \\ R_{0k}^1 \end{bmatrix} L_k^* = \begin{bmatrix} W_{0k}^0 e^{j\alpha} & W_{1k}^0 e^{j\alpha} \\ W_{0k}^1 e^{j\beta} & W_{1k}^1 e^{j\beta} \end{bmatrix} \begin{bmatrix} H_{0k} \\ H_{1k} \end{bmatrix}.$$

The notation $e^{j\alpha}$ is the phase value at time block 0 and $e^{j\beta}$ is the phase value at time block 1. The phase difference is $(e^{j\beta} - e^{j\alpha})$. Accordingly, if $e^{e\alpha}$ is absorbed in H to define a new H' and $\theta$ is defined as $(\beta - \alpha)$, this results in $e^{j\theta} = e^{j(\beta - \alpha)}$.

Then, a CFO corrected matrix operation that uses a CFO modified weighting matrix W may be written as:

$$\begin{bmatrix} R_{0k}^0 \\ R_{0k}^1 \end{bmatrix} L_k^* = \begin{bmatrix} W_{0k}^0 & W_{1k}^0 \\ W_{0k}^1 e^{j\theta} & W_{1k}^1 e^{j\theta} \end{bmatrix} \begin{bmatrix} H_{0k}' \\ H_{1k}' \end{bmatrix}.$$

For even and odd tones, the $W_{even}$ and $W_{odd}$ matrices may be represented as $$W_{even} = \begin{bmatrix} 1 & 1 \\ e^{j\theta} & -e^{j\theta} \end{bmatrix} \text{ and } W_{odd} = \begin{bmatrix} 1 & -1 \\ e^{j\theta} & e^{j\theta} \end{bmatrix}$$

in the first embodiment noted above; and for the second embodiment above, $$W_{even} = \begin{bmatrix} 1 & 0 \\ 0 & e^{j\theta} \end{bmatrix} \text{ and } W_{odd} = \begin{bmatrix} 0 & 1 \\ e^{j\theta} & 0 \end{bmatrix}.$$

An equivalent technique is then implemented to calculate for the phase roll across the two time blocks for the second receiver antenna to calculate $R_{1k}^0$ and $R_{1k}^1$ to determine CFO for $RX_1$, using corresponding H parameters.

Accordingly, since the above described technique addresses how channel estimation calculations may be modified to account for the CFO phase shift between two time blocks of transmission, it now becomes a matter of identifying the amount of the phase shift to compensate for this phase difference. As noted above, this phase shift is the same (flat) across all tones for a given time block, so phase detection is done at only one tone and applied to the other tones for channel estimation. For example, subcarriers of an OFDM signal of FIG. 4 transmitted during time block 0 have a phase value $\alpha$ and subcarriers of the same OFDM signal transmitted during time block 1 have a phase value $\beta$. This detected CFO phase difference at one tone is applied to the other tones to obtain a CFO weighting matrix W that is used in channel estimation.

It is to be noted that various techniques may be implemented to determine the CFO phase shift between the two time blocks. Since the phase shift is directly proportional to the frequency offset, in one embodiment, this phase shift may be determined and compensated or removed in the frequency domain after performing FFT. Alternatively, the phase difference may be determined in the time domain prior to FFT. Since the incoming signal has the form $e^{-j2\pi(\Delta f c)N(Ts)}$ and since N and Ts are known factors, $\Delta f_c$ may be resolved through correlation of repeated information (which may be done through repeated patterns in a training sequence). Furthermore, calculation of $\Delta f_c$ may be made simpler by utilizing an estimate of $\Delta f_c$ initially in the calculation and determining a CFO that adds an additional phase shift due to the tones being transmitted in separate time blocks. The initial estimate may be the calculation of general CFO for the system that is not attributable to the CFO attributed to the separate time block for transmission of tones. Such general CFO may be obtained by other techniques, including other known techniques.

It is to be noted that the correlation of the sampled signals may be performed with various portions of the sent packet. However, in one embodiment, training sequences present in the preamble portion of the packet is utilized to obtain the phase information, instead of the payload portion of the packet. For example, a long training (LTRN) field (training sequence) of a preamble of a packet may include a number of repetitive sequences that allows the receiver to perform the correlation on the LTRN data to obtain the phase information. A same technique is used with the LTRN field received with the second time block symbol. The phase shift information is then derived by calculations performed on the result of the training sequences to determine the CFO that is introduced between the time blocks.

Figure 7:
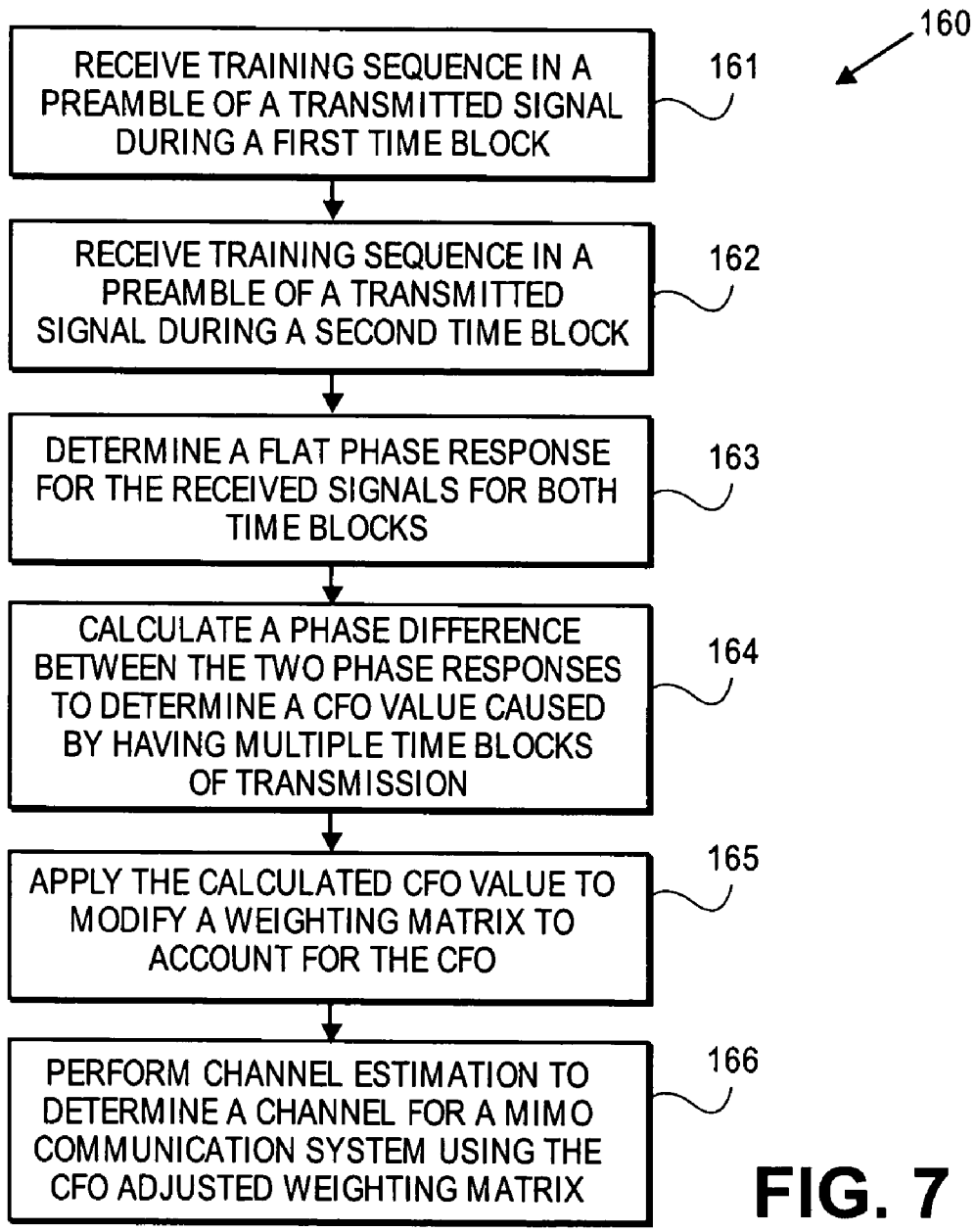
FIG. 7 is a flow diagram illustrating one method to determine CFO in a receiver and adjusting for the CFO to perform channel estimation.

FIG. 7 illustrates one embodiment of a method to perform channel estimation in a receiver of a MIMO communication system, where CFO adjustments are made in performing the channel estimation. The illustrated technique of diagram 160 is operable with the OFDM example noted above and may be made operable with other transmission schemes or protocols that are orthogonal. As noted in diagram 160, a training sequence is received in a preamble of a transmitted signal during a first time block or period (block 161). Subsequently, a training sequence is received in a preamble of a transmitted signal during a second time block or period (block 162). In the particular OFDM example described above, the first and second time blocks correspond to transmission of respective even/odd tones of the OFDM signal.

Next, a flat phase response is determined for the received signals for both time blocks (block 163). Then, a phase difference is calculated between the two phase responses to determine a CFO value caused by having multiple time blocks (block 164). The CFO value is applied to modify a weighting matrix used for channel estimation to account for the CFO (block 165). Finally, the CFO adjusted weighting matrix is used to perform channel estimation calculations to determine a channel for a MIMO communication system (block 166).

It is to be noted that diagram 160 illustrates just one example on how to account for CFO in performing channel estimation and that other embodiments may be readily implemented within the spirit and scope of the invention. An example apparatus to practice the invention to perform channel estimation with corrections for CFO is described in reference to FIG. 10, after the following section pertaining to SFO.

Channel Estimation with SFO

Similar to CFO, sampling frequency offset (SFO) is well known in communication systems and variety of techniques address the estimation and correction of SFO in a receiver. SFO is the result of the actual sampling clock frequency being slightly off from the theoretical or desired sampling rate. Aside from introducing sampling rate error, with sufficient offset "sample slip" may occur in sampling the signal. Sample slip is a situation in which one or more samples slip out of the sampling window or undesired samples introduced into the sampling window. Similar to CFO, techniques are available for SFO estimation and correction. One technique for estimating and correcting SFO is described in a co-pending patent application entitled "Apparatus and method for sampling frequency offset estimation and correction in a wireless communication system;" application Ser. No. 11/312,510; filed Ser. No. 12/21/2005; which application is incorporated herein by reference. However, these existing SFO techniques do not address the SFO component introduced in the receiver when OFDM tones are sent over multiple time blocks and correcting for this SFO to perform channel estimation in the receiver.

With the afore-mentioned technique of transmitting even and odd tones at different time blocks, a CFO phase shift was introduced between the first and second time blocks. Similarly, a phase shift in the SFO may occur for respective tones between time block 0 and time block 1. However, where CFO typically introduced a substantially flat phase shift response across the OFDM tones, SFO response is tone sensitive, so that the amount of the phase shift of the sampling frequency $f_s$ is dependent on the frequency of the tone, so that the resulting phase response curve has a substantially linear slope. Instead of having a flat phase shift between time block 0 and time block 1 across the tones, SFO response is more of a phaser that rotates about an apex. That is, the offset near the center of the OFDM tone spectrum is small, but the phase difference increases when moving in the direction towards the outer most tones.

Figure 8:
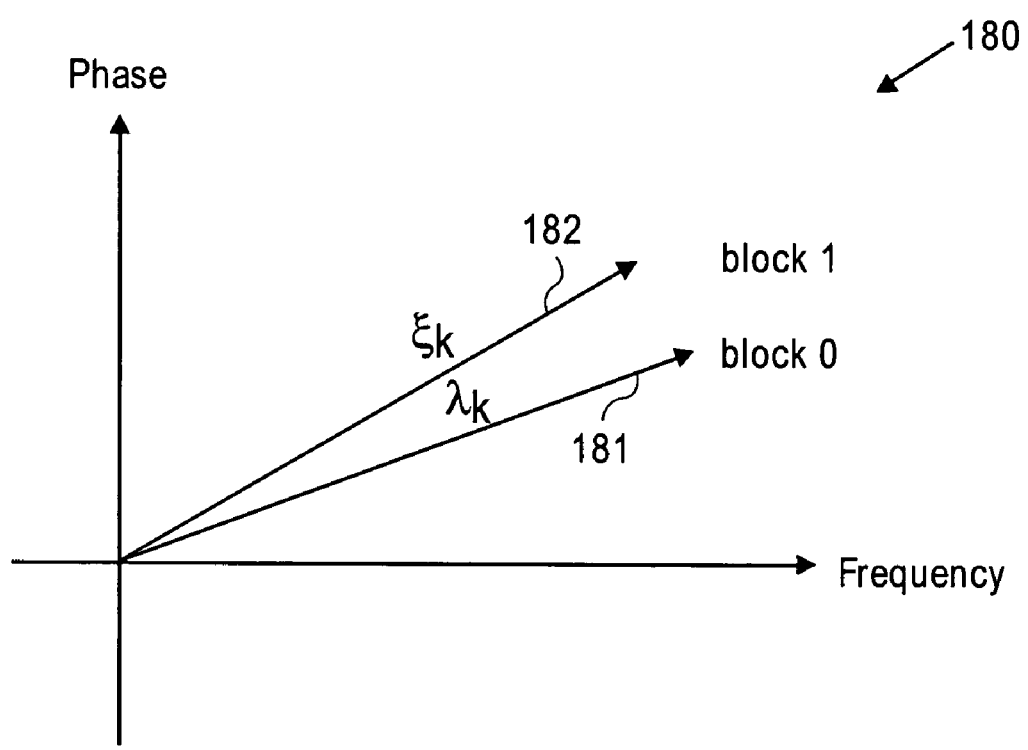
FIG. 8 is a diagram illustrating a SFO that has a linear phase shift across tones of an OFDM signal transmitted in two time blocks, in which the OFDM signal has energy content in the even tones during one time block and in the odd tones during another time block.

In FIG. 8, a phase-frequency diagram 180 illustrates a phase shift that occurs to the symbol between time block 0 and time block 1 due to a phase shift in the SFO. At time block 0, the phase of SFO for the channel may be represented by $\lambda_k$ and at time block 1, the phase of SFO for the channel may be represented by $\xi_k$. The amount of the phase difference between $\lambda_k$ and $\xi_k$ grows linearly with the frequency. If SFO did not experience a phase difference between time block 0 and time block 1, phase $\lambda_k$ would equal phase $\xi_k$. However, due to the time difference between block 0 and block 1, an additional SFO phase shift is introduced on top of $\lambda_k$, but that phase shift increases linearly. The additive influence on the phase of the incoming signal as time lapses is also referred to as "phase roll," but the SFO phase roll has a linear slope as shown in FIG. 8, which is different than the flat CFO phase roll of FIG. 6.

The SFO phase shift may be adjusted for in a similar technique as for CFO, in order to obtain a weighting matrix W that adjusts for the SFO phase shift. Using the example noted above for CFO at receiver antenna $RX_0$, a similar set of equations may be used to designate SFO:

$$R_{0k}^0 = W_{0k} L_k H_{0k} e^{j\lambda_k} + W_{1k}^0 L_k H_{1k} e^{j\lambda_k}$$

$$R_{0k}^1 = W_{0k} L_k H_{0k} e^{j\xi_k} + W_{1k}^1 L_k H_{1k} e^{j\xi_k}$$

which gives the resulting SFO matrix, $$\begin{bmatrix} R_{0k}^0 \\ R_{0k}^1 \end{bmatrix} L_k^* = \begin{bmatrix} W_{0k}^0 e^{j\lambda_k} & W_{1k}^0 e^{j\lambda_k} \\ W_{0k}^1 e^{j\xi_k} & W_{1k}^1 e^{j\xi_k} \end{bmatrix} \begin{bmatrix} H_{0k} \\ H_{1k} \end{bmatrix}.$$

If $e^{j\lambda_k}$ is absorbed in H to define a new H' and $\gamma_k$ is defined as $(\xi_k - \lambda_k)$, then $e^{j\gamma_k} = e^{j(\xi_k - \lambda_k)}$.

Then a modified weighting matrix for SFO may be represented as $$\begin{bmatrix} R_{0k}^0 \\ R_{0k}^1 \end{bmatrix} L_k^* = \begin{bmatrix} W_{0k}^0 & W_{1k}^0 \\ W_{0k}^1 e^{j\gamma_k} & W_{1k}^1 e^{j\gamma_k} \end{bmatrix} \begin{bmatrix} H_{0k}' \\ H_{1k}' \end{bmatrix}.$$

For even and odd tones, the $W_{even}$ and $W_{odd}$ matrices may be represented as $$W_{even} = \begin{bmatrix} 1 & 1 \\ e^{j\gamma_k} & -e^{j\gamma_k} \end{bmatrix} \text{ and } W_{odd} = \begin{bmatrix} 1 & -1 \\ e^{j\gamma_k} & e^{j\gamma_k} \end{bmatrix}$$

in the first embodiment noted above; and for the second embodiment above, $$W_{even} = \begin{bmatrix} 1 & 0 \\ 0 & e^{j\gamma_k} \end{bmatrix} \text{ and } W_{odd} = \begin{bmatrix} 0 & 1 \\ e^{j\gamma_k} & 0 \end{bmatrix}$$

However, in this instance, tone k becomes a factor in the weighting matrix, since the SFO phase shift is linear across tones. Accordingly, phase detection would be performed at each tone to assess the phase difference at each tone in order to perform the channel estimation using the SFO modified weighting matrix W. Although, this approach may be used, the number of phase detection and calculation required are numerous and may take considerable amount of time to obtain. Accordingly in one embodiment for SFO phase shift determination, an alternative technique is employed, which is described below.

For many radio receivers, there is a causal relationship between SFO and CFO. For example, the receiver may use the same particular clock reference to drive clock signals at $f_c$ and $f_s$. Since the underlying cause of SFO and CFO is from the same source, the amount of the offsets for CFO and SFO have substantially the same proportional relationship. That is, if the offset for $f_c$ has a value of "x" parts-per-million, then the offset for $f_s$ is found to have substantially the same "x" parts-per million value. For this reason, communication standards impose the same parts-per-million offset requirement on both CFO and SFO. That is, if CFO is designated to not exceed "x" parts-per-million, then the same "x" parts-per-million constraint applies to SFO as well. The embodiment described below takes advantage of this proportionality and employs this relationship in calculating SFO for channel estimation.

A proportionality value "p" is defined in which $p=\Delta f_c/f_c$, where $\Delta f_c$ is the offset from the carrier frequency $f_c$. The $\Delta f_c$ value may be an actual offset value or an estimated offset value. Since CFO has a flat phase response, p is substantially the same for all tones. Thus when $\Delta f_c$ calculation is made (whether actual or estimated), a fixed "p" may be determined. Because of the causal relationship between CFO and SFO, as described above, this same relationship may be used to calculate SFO. That is, $\Delta f_s=(p)(f_s)$, where $\Delta f_s$ is a calculated estimate based on the proportionality value p, which is determined from the CFO response. In this instance, p is still fixed, but the value of the sampling frequency $f_s$ depends on the tone placement ($f_s$ increases moving outward to the outer tones). That is, carrier index 0 has substantially zero $\Delta f_s$ (see FIG. 4), but the outer most tones (subcarrier index +M/2 and −M/2) have high $f_s$. Because $\Delta f_s=(p)(f_s)$, $\Delta f_s$ increases as $f_s$ increases at each tone. This increase, when mapped, is similar to the phase shift exemplified in the phase shift diagram of FIG. 8, where $\Delta f_s$ is estimated by $(p)(f_s)$.

Thus, when $\Delta f_s$ is estimated by $(p)(f_s)$, an estimated $\Delta f_s$ may be calculated at each tone k without making an actual phase detection at each tone. Once p is determined from the CFO, that p value is then used to determine $\Delta f_s$ at each tone, so that the phase shift that is calculated for SFO has a linear response. The phase shift is added to the phase value of the last time block for each tone to determine the estimated phase shift at each tone. A phase detection may be made at one or more tone locations to determine the actual phase to ensure that the estimated phase values are substantially that of the actual value.

Figure 9:
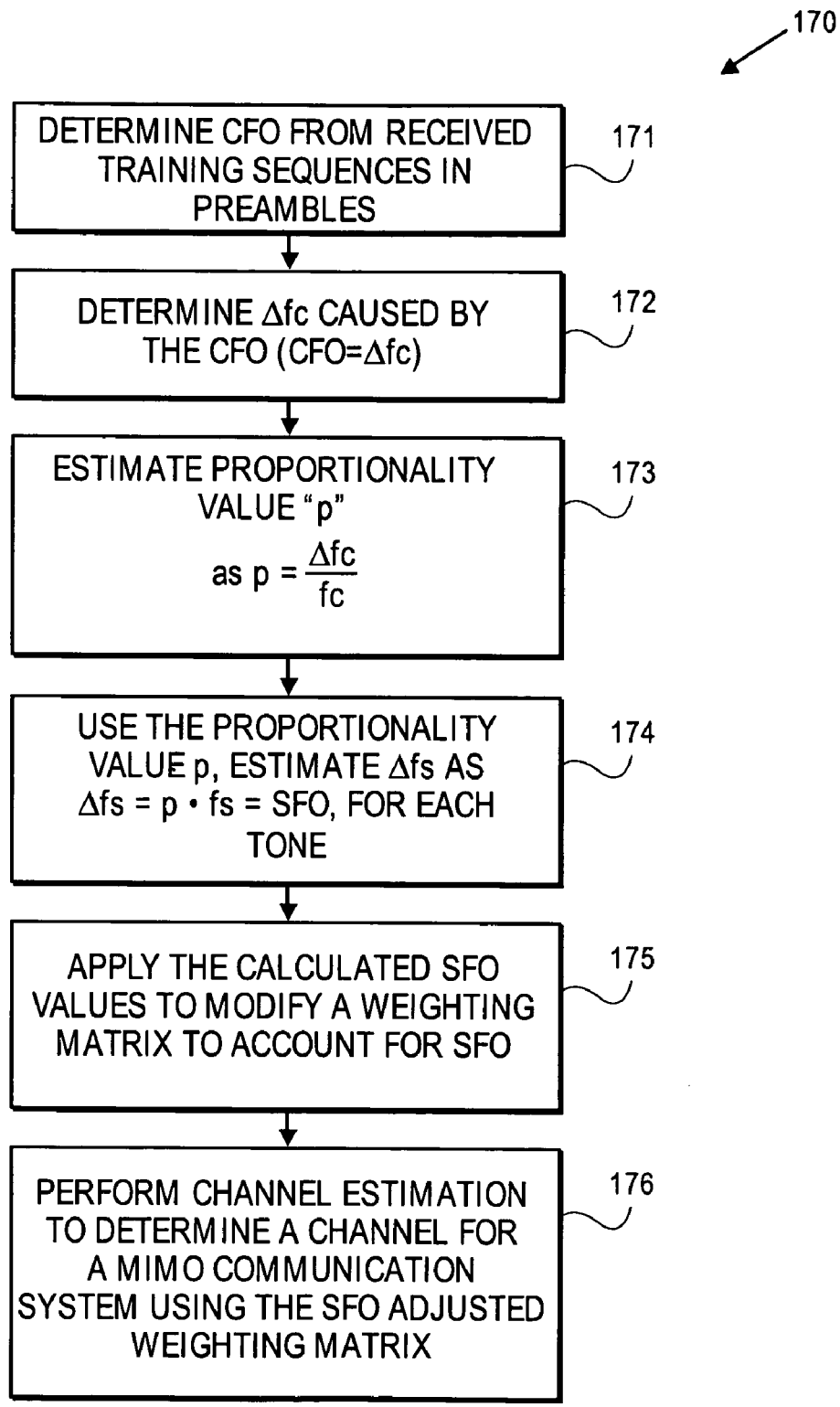
FIG. 9 is a flow diagram illustrating one method to determine SFO in a receiver and adjusting for the SFO to perform channel estimation.

FIG. 9 illustrates one embodiment of a method to perform channel estimation in a receiver of a MIMO communication system, where SFO adjustments are made in performing the channel estimation. The illustrated technique of diagram 170 is operable with the OFDM example noted above and may be made operable with other transmission schemes or protocols that are orthogonal. As noted in diagram 170, CFO is determined from training sequences received in preambles of transmitted signals (block 171). Subsequently, $\Delta f_c$ is determined that causes a phase shift having a flat response across tones (block 172). In the particular OFDM example described above, the first and second time blocks correspond to transmission of respective even/odd tones of the OFDM signal. In one embodiment, the CFO determination is obtained by the technique described in FIG. 7. In alternative embodiments, CFO may be obtained by other techniques or a fixed estimate, based on some other CFO estimation, may be used to obtain the value p.

Next, a proportionality value p is determined where $p=\Delta f_c/f_c$ (block 173). Then, the proportionality value p is used to estimate $\Delta f_s$, where $\Delta f_s=(p)(f_s)$, for each tone, to determine SFO (block 174). The SFO value is applied to modify a weighting matrix to account for the SFO (block 175) at each tone. Finally, the SFO modified weighting matrix is used to perform channel estimation calculations to determine a channel estimate for a MIMO communication system (block 176).

It is to be noted that diagram 170 illustrates just one example on how to account for SFO in performing channel estimation and that other embodiments may be readily implemented within the spirit and scope of the invention. That is, SFO calculation for channel estimation is not limited to the technique shown in diagram 170. SFO may be obtained from other techniques, whether computed from CFO, computed directly or obtained otherwise (such as being read from a register). However the SFO is obtained, the SFO value is used in performing channel estimation. That is, whatever technique is used to obtain the SFO value, that SFO value is used to modify the weighting matrix (block 175) to perform channel estimation (block 176). An example apparatus to practice the invention to perform channel estimation with residual SFO is described below in reference to FIG. 10.

CFO and SFO Circuitry

It is to be noted that the present invention may be practiced in a number of devices. For wireless communication, embodiments of the invention may be practiced in a number of radio receivers. For example, radio receivers 71 and baseband processing module 63 of FIG. 2 may be utilized to provide the down conversion of the RF signal and recovery of the data. The channel estimation function is obtained in the baseband processing module 63. In a 2×2 MIMO system, two receivers 71 would be utilized, one as $RX_0$ and the second as $RX_1$.

Figure 10:
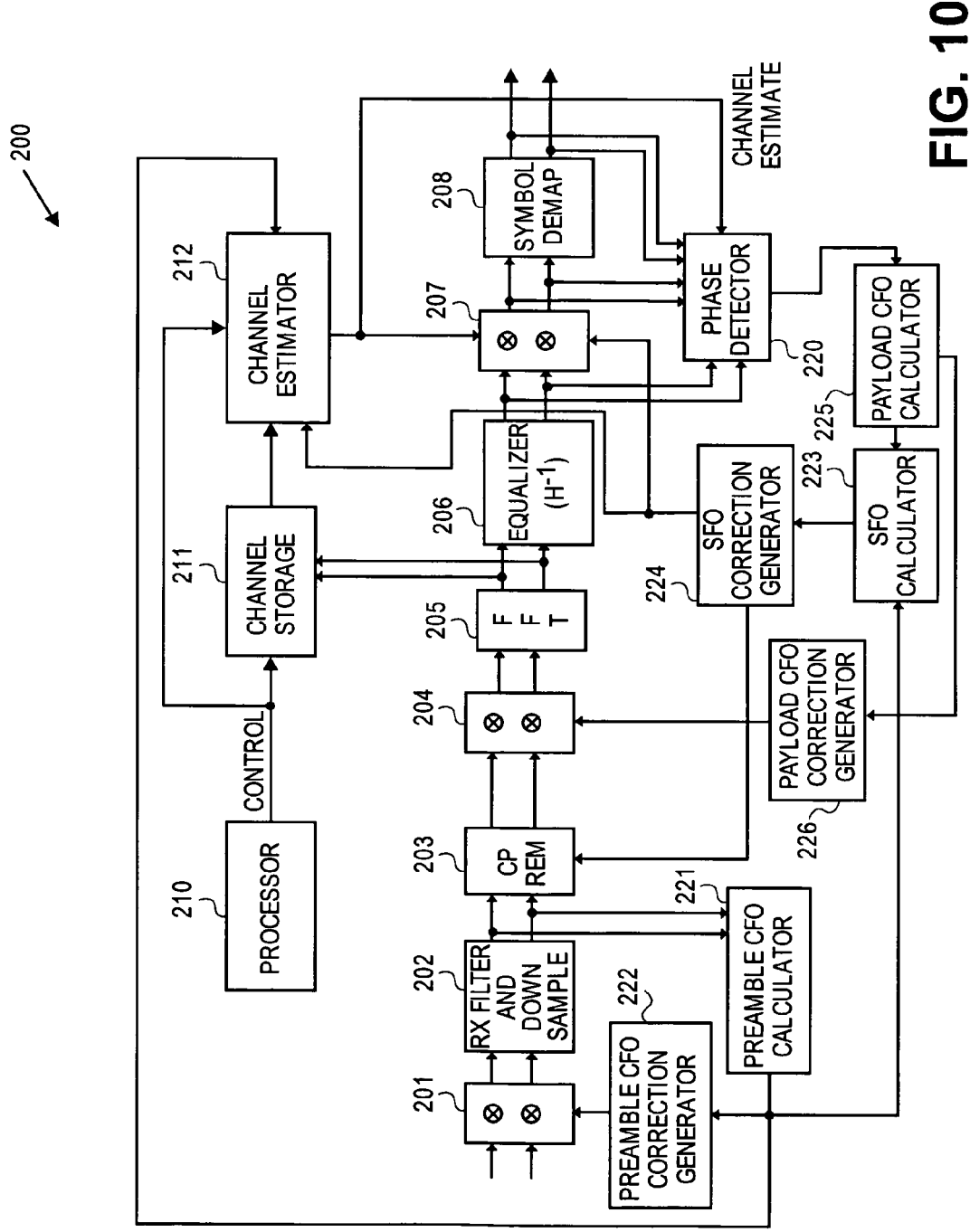
FIG. 10 is a block circuit diagram of an apparatus showing one example implementation of a radio receiver to account for CFO and SFO in performing channel estimation.

Alternatively, FIG. 10 illustrates another example embodiment for practicing the invention.

FIG. 10 shows a block diagram of a receiver circuit 200, which is part of a MIMO receiver that uses multiple time blocks to receive preamble information for estimating the channel. As noted above, one example technique for obtaining orthogonality for a 2×2 MIMO communication relies using two time blocks to receive preamble information at each antenna. The preambles in successive time blocks from each antenna are used to perform channel estimation to determine the correct locations for the signal points in a signal constellation. Circuit 200 may be implemented in the wireless communication apparatus of FIG. 2, which may be implemented in one or more devices shown in FIG. 1. Circuit 200 may be implemented in other devices as well.

For circuit 200, the two signal paths of the 2×2 MIMO receiver are coupled to a receive filter and down-sample module 202 via a phase correction module 201. Module 202 filters and down samples the received signals. The output of module 202 is coupled to a cyclic prefix removal module (CP REM) 203, which is used to correct for any cyclic slip. The output of CP REM 203 is coupled to a time-domain phase correction module 204, which output is then coupled to a Fast Fourier Transform (FFT) module 205 to transit from the time domain to the frequency domain for the incoming signal. The output of FFT is coupled to an equalizer 206, which is followed by a frequency-domain phase correction module 207 and a symbol demapping module 208. It is to be noted that one or more of the phase correction modules 201, 204 and/or 207 may be phase locked loop (PLL) devices.

The modules prior to the FFT module 205 are generally utilized to filter, sample, correct and otherwise prepare the input signal for FFT conversion. CP REM 203 is shown, but is an optional component and may not be present in some embodiments. FFT module 205 provides the time-frequency transformation so that the signal may be operated on in the frequency domain by equalizer module 206 and symbol demapping module 208. Equalizer module 206 provides the $H^{-1}$ (channel inversion operation) to recover the intelligence transmitted through channel H and module 208 provides the placement of the recovered symbols in the signal constellation to obtain the transmitted information.

Also for circuit 200, the output from module 202 is coupled to a preamble CFO calculator module 221 and the output from module 221 is then coupled to a preamble CFO correction generator module 222, channel estimator module 212 and SFO calculator module 223. The output from preamble CFO correction generator module 222 is coupled to phase correction module 201. Furthermore, output of FFT module 205 is coupled to a channel storage module 211 for storing of received signal information. Channel storage module 211 is coupled to channel estimator module 212, which module 212 is utilized to perform the channel estimation. A processor 210 provides control signals to channel storage module 211 and channel estimator module 212. Although not shown, processor 210 may be coupled to one or more devices of FIG. 10 as well.

Furthermore, the output from equalizer 206, frequency-domain phase correction module 207 and symbol demap module 208, along with the channel estimator output, are coupled to a phase detector module 220. The output from phase detector module 220 is coupled to a payload CFO calculator module 225. The output from payload CFO calculator module 225 is coupled to SFO calculator module 223 and to payload CFO correction generator 226. The output from SFO calculator module 223 is coupled to SFO correction generator module 224, which module 224 output is coupled to CP REM 203 (if used), phase correction module 207 and channel estimator module 212. The output of payload CFO correction generator 226 is coupled to time-domain phase correction module 204.

In operation, circuit 200 receives the first time block (time block 0) symbols from both transmitting antennas and after filtering and sampling and performing FFT, stores the information in channel storage module 211. Channel storage module 211 may be a buffer, cache, memory or any other device that stores information. Since both time block 0 and time block 1 preamble information are utilized to obtain channel estimation, the preamble information from the output of module 202 is sent to preamble CFO calculator module 221.

Similarly, during the second time block reception (time block 1), the incoming symbols from the transmitting antennas are processed. The second time block information may be stored in channel storage module 211 or sent directly to channel estimator module 212, along with the stored time block 0. The preamble information is sent to preamble CFO calculator module 221. With both time block information, preamble CFO calculator module 221 may perform the CFO calculation and the CFO information is sent to channel estimator module 212 to be used in channel estimation. Channel estimator module 212 performs the calculations to obtain the channel estimation and provides the information to equalizer 206, which then performs the inverse channel operation on both time block 0 and time block 1 symbols for data recovery and demapping by symbol demap module 208.

Accordingly, in order to determine CFO for the preambles sent in each of the time blocks, an output from module 202 is coupled to preamble CFO calculator 221 to identify and utilize the appropriate training sequence(s) to calculate the phase of the carrier frequency for the incoming symbols to determine the CFO phase. Preamble CFO calculator 221 determines the CFO phase difference of the preambles for the two time blocks (time block 0 and time block 1) and provides the phase difference to preamble CFO correction generator 222, which then generates a correction signal to phase correction module 201. The correction signal may be used to correct for the CFO by adjusting the phase of the incoming symbols in phase correction module 201.

The information on the phase of the CFO of the preambles of the two time blocks, generated by preamble CFO calculator 221, is sent to channel estimator module 212. Channel estimator module 212 uses this CFO phase shift information in performing the calculations for the channel estimate, which technique was described above, and to make appropriate corrections for the CFO phase roll experienced between the two time blocks.

SFO phase correction is performed in a similar manner for channel estimation. A SFO value may be obtained in a variety of ways and used of performing channel estimation. Circuit 200 shows one embodiment, in which SFO is obtained from CFO. As shown, SFO calculator module 223 receives CFO information from module 221. This CFO information provided is utilized to determine p ($p=\Delta f_c/f_c$). The value of "p" may be calculated in module 221 or 223. In any event, SFO calculator module 223 uses p to set the amount of phase correction that is to be provided for SFO. This SFO information is sent to SFO correction module 224, which generates a correction signal to channel estimator module 212 for performing channel estimation with the SFO phase correction. A correction signal may also be sent to phase correction module 207, which is situated in the frequency domain after equalizer module 206. In other embodiments where the SFO information is derived from a source other than the CFO, the SFO information is derived or obtained from the SFO source and sent to SFO correction module 224. For, circuit 200, it couples preamble CFO generation to SFO calculator module 223, since in this embodiment SFO is derived from CFO and, more specifically, preamble SFO is derived from preamble CFO.

The preamble SFO output from module 223 is sent SFO correction generator 224, which output is then sent to channel estimator module 212. Channel estimator module 212 uses this preamble SFO information in performing the calculations for the channel estimate, which technique is described above, and to make appropriate corrections for the phase roll experienced between the information in the two time blocks.

Phase detector 220 receives outputs from equalizer module 206, phase correction module 207 and symbol demap module 208 to obtain phase information at each of these outputs. Phase detector 220 is utilized to detect the phase of the payload portion of the received signal (such as the payload of a data packet), in order to correct for CFO and SFO in the payload. Note that the payload is comprised of data and the payload is not utilized for channel estimation. The output of phase detector 220 is coupled to payload CFO calculator module 225 to calculate the CFO of the payload. The output of payload CFO calculator is sent to payload CFO correction generator 226, which generates a payload CFO correction signal to phase correction module 204 to correct the phase of the received signal in processing the payload.

The output of payload CFO calculator module 225 is also coupled to SFO calculator module 223 to calculate the SFO for the payload portion of the received information. SFO calculator module 223 and SFO correction generator 224 provides a correction signal to phase correction module 207 to correct for the SFO in processing the payload. In this instance when payload is processed, SFO signal is not sent to channel estimation module 212. Again, it is to be noted that payload SFO may be calculated from other means and need not be based on CFO calculation. However, as noted above, in one embodiment SFO calculation is obtained from CFO. This may be done for the preamble, payload or both.

Furthermore, module 224 sends correction information to CP REM module 203 (if present) to adjust for any cyclic slip. Additionally, it is to be noted that in some embodiments, there may be a separate SFO adjustment for the preamble and for the payload data. It is to be noted that various other embodiments may be implemented to practice one or more of the techniques described herein. It is also to be noted that when performing channel estimation, CFO phase shift correction or SFO phase shift correction may be employed alone without the other, or alternatively, both corrections may be employed. With the implementation of SFO correction for channel estimation, the SFO value may be obtained from various sources and need not be obtained from CFO. The use of value p to derive the SFO from CFO is just one acceptable technique to obtain SFO. What is to be noted is that however the CFO and/or SFO are/is calculated, the calculation is obtained from the preamble portion of the received symbols so that channel estimation may be performed using the calculated CFO/SFO value(s). In this manner, channel estimation may be performed to obtain a more accurate estimation of the channel prior to processing the data in the payload.

Thus, channel estimation in presence of CFO and/or SFO in a MIMO system is described. It is to be noted that although a 2×2 MIMO system is described in detail, the practice of the invention for channel estimation is not limited to such 2×2 MIMO systems. For example, the afore-mentioned co-pending patent application entitled "Channel estimation for orthogonal preambles in a MIMO system;" application Ser. No. 11/298,157; filed Dec. 09/2005, describe a 3×3 MIMO system. The embodiments of the present invention may be readily made operable with such 3×3 MIMO system or any N×M MIMO system with applicable adjustments to the weighting matrix (or matrices) used with such N×M system.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more of its corresponding functions and may further include inferred coupling to one or more other items.

Furthermore, the term "module" is used herein to describe a functional block and may represent hardware, software, firmware, etc., without limitation to its structure. A "module" may be a circuit, integrated circuit chip or chips, assembly or other component configurations. Accordingly, a "processing module" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions and such processing device may have accompanying memory. A "module" may also be software or software operating in conjunction with hardware.

The embodiments of the present invention have been described above with the aid of functional building blocks illustrating the performance of certain functions. The boundaries of these functional building blocks have been arbitrarily defined for convenience of description. Alternate boundaries could be defined as long as the certain functions are appropriately performed. Similarly, flow diagram blocks and methods of practicing the embodiments of the invention may also have been arbitrarily defined herein to illustrate certain significant functionality. To the extent used, the flow diagram block boundaries and methods could have been defined otherwise and still perform the certain significant functionality. Such alternate definitions of functional building blocks, flow diagram blocks and methods are thus within the scope and spirit of the claimed embodiments of the invention. One of ordinary skill in the art may also recognize that the functional building blocks, and other illustrative blocks, modules and components herein, may be implemented as illustrated or by discrete components, application specific integrated circuits, processors executing appropriate software and the like or any combination thereof.

I claim:

1. A method comprising:
   determining, in a receiver, a sampling frequency offset (SFO) for symbols of a signal communicated across a multiple antenna communication channel, in which preambles to be utilized for channel estimation are communicated in the symbols over more than one time period, wherein SFO for a first symbol communicated during a first time period and a second symbol communicated during a second time period have a substantially linear phase response that is dependent on frequency and a SFO phase shift between the first symbol and the second symbol has a proportional shift based on the linear response that is dependent on frequency;
   modifying, in the receiver, a weighting matrix that is employed to perform channel estimation to determine an estimate of the communication channel, the weighting matrix modified to account for the SFO phase shift between the first and second symbols; and
   performing, in the receiver, channel estimation using the modified weighting matrix to correct for the SFO phase shift between the first and second time periods.

2. The method of claim 1, wherein the first and second symbols are communicated as orthogonal signals.

3. The method of claim 1, wherein the first and second symbols are communicated by orthogonal frequency division multiplexing (OFDM).

4. The method of claim 3, further comprising:
   calculating, in the receiver, a proportionality value "p" based on a ratio of a carrier frequency offset $\Delta fc$ to a carrier frequency fc, so that $p=\Delta fc/fc$; and
   estimating, in the receiver, the SFO phase shift between the first symbols and the second symbols by applying the proportionality value p to a sampling frequency fs to obtain $\Delta fs$ so that $\Delta fs=(p)(fs)$, wherein $\Delta fs$ is used as a calculated value of the SFO phase shift.

5. The method of claim 3, wherein the weighting matrix has terms to account for both a SFO phase response $\lambda k$ for the first symbol and a SFO phase $\xi k$ for the second symbol, in which k denotes a tone of an OFDM signal that has a linear phase shift with respect to frequency.

6. The method of claim 5, wherein the weighting matrix is further modified to provide a second weighting matrix, in which a phase difference $(\xi k - \lambda k)$ is absorbed into the weighting matrix to remove phase component variable from some terms of the modified weighting matrix.

7. The method of claim 6, wherein the second weighting matrix is utilized on a modified channel H' to perform channel estimation on symbols received by one of a plurality of receiving antennas, in which the channel estimation is provided using a training sequence present in one or more preambles in the first and second symbols.

8. A method comprising:
   receiving, in a receiver, a first symbol associated with a first signal transmitted across a communication channel of a multiple-input-multiple-output (MIMO) communication system during a first time block;
   receiving, in the receiver, a second symbol associated with a second signal transmitted across the communication channel of the MIMO communication system during a second time block, in which preambles of both the first and second symbols are used to perform channel estimation to recover the transmitted signals transmitted during successive time blocks;
   determining, in the receiver, a sampling frequency offset (SFO) for the first symbol and the second symbol, wherein the SFOs for the first and second symbols have a substantially linear phase response that is dependent on frequency and a SFO phase shift between the first symbols and the second symbols has a proportional shift based on the linear response that is dependent on frequency;
   modifying, in the receiver, a weighting matrix that is employed to perform channel estimation to determine the communication channel for the transmitted signals, the weighting matrix modified to account for the SFO phase shift; and
   performing, in the receiver, channel estimation using the modified weighting matrix to correct for the SFO phase shift between the first and second time blocks.

9. The method of claim 8, wherein the first and second symbols are transmitted as orthogonal signals.

10. The method of claim 8, wherein the first and second symbols are transmitted by orthogonal frequency division multiplexing (OFDM).

11. The method of claim 10, further comprising:
    calculating, in the receiver, a proportionality value "p" based on a ratio of a carrier frequency offset $\Delta fc$ to a carrier frequency fc, so that $p=\Delta fc/fc$; and
    estimating, in the receiver, the SFO phase shift between the first symbols and the second symbols by applying the proportionality value p to a sampling frequency fs to obtain $\Delta fs$ so that $\Delta fs=(p)(fs)$, wherein $\Delta fs$ is used as a calculated value of the SFO phase shift.

12. The method of claim 10, wherein the weighting matrix has terms to account for both a SFO phase response $\lambda k$ for the first symbol and a SFO phase $\xi k$ for the second symbol, in which k denotes a tone of an OFDM signal that has a linear phase shift with respect to frequency.

13. The method of claim 12, wherein the weighting matrix is further modified to provide a second weighting matrix, in which a phase difference $(\xi k - \lambda k)$ is absorbed into the weighting matrix to remove phase component variable from some terms of the modified weighting matrix.

14. The method of claim 13, wherein the second weighting matrix is utilized on a modified channel H' to perform channel estimation on symbols received by one of a plurality of receiving antennas, in which the channel estimation is provided using a training sequence present in one or more preambles in the first and second symbols.

15. An apparatus comprising:
    a sampling module coupled to receive an incoming signal communicated across a multiple-input-multiple-output (MIMO) communication channel and to sample the incoming signal;
    a Fast Fourier Transform (FFT) module coupled to transform the sampled signal from a time-domain signal to a frequency-domain signal;
    a sampling frequency offset (SFO) calculation module coupled to provide SFO phase information for the incoming signal based on preambles that are utilized for channel estimation;
    a channel estimator module coupled to the FFT module to receive the transformed sampled signal and also coupled to the SFO calculation module to receive SFO phase information to perform channel estimation of the communication channel which is corrected for SFO, the channel estimator module to use the estimated SFO phase information to correct for preambles used for channel estimation which arrive during two different time periods and in which substantially linear phase response that is dependent on frequency is imposed on the preambles so that a SFO phase shift between the first symbol and the second symbol has a proportional shift based on the linear response that is dependent on frequency, and the channel estimator module to modify a weighting matrix that is employed to perform channel estimation by use of the SFO phase information to determine an estimate of the communication channel, the weighting matrix modified to account for the SFO phase shift between the two time periods.

16. The apparatus of claim 15, wherein the incoming signal is a orthogonal frequency division multiplexing (OFDM) signal.

17. The apparatus of claim 16, wherein the weighting matrix has terms to account for both a SFO phase response $\lambda k$ for the first symbol and a SFO phase $\xi k$ for the second symbol, in which k denotes a tone of an OFDM signal that has a linear phase shift with respect to frequency.

18. The apparatus of claim 17, wherein the weighting matrix is further modified to provide a second weighting matrix, in which a phase difference ($\xi k - \lambda k$) is absorbed into the weighting matrix to remove phase component variable from some terms of the modified weighting matrix.

19. The apparatus of claim 15 further comprising a SFO correction generator module coupled to the SFO calculation module to generate an offset signal to correct for the SFO phase shift of the incoming signal.

20. The apparatus of claim 16, wherein the SFO calculation module further determines a current SFO phase and to use a proportionality value "p" based on a ratio of a carrier frequency offset $\Delta fc$ to a carrier frequency fc, so that $p=\Delta fc/fc$, in order to estimate the SFO phase shift between the first symbol and the second symbol by applying the proportionality value p to a sampling frequency fs to obtain $\Delta fs$ so that $\Delta fs=(p)(fs)$, wherein $\Delta fs$ is used as a calculated value of the SFO phase shift.

* * * * *